United States Patent
Ji et al.

(10) Patent No.: US 10,267,389 B2
(45) Date of Patent: Apr. 23, 2019

(54) MULTI-STAGE TRANSMISSION FOR VEHICLES

(71) Applicants: HYUNDAI MOTOR COMPANY, Seoul (KR); KIA MOTORS CORPORATION, Seoul (KR)

(72) Inventors: Seong Wook Ji, Gunpo-si (KR); Hyun Sik Kwon, Seoul (KR); Won Min Cho, Hwaseong-si (KR); Seong Wook Hwang, Gunpo-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/825,531

(22) Filed: Nov. 29, 2017

(65) Prior Publication Data
US 2019/0093740 A1 Mar. 28, 2019

(30) Foreign Application Priority Data
Sep. 28, 2017 (KR) .......................... 10-2017-0125746

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 9,587,714 B2 | 3/2017 | Kook et al. | |
| 2013/0203550 A1* | 8/2013 | Mellet | F16H 3/66 475/276 |
| 2016/0169336 A1* | 6/2016 | Cho | F16H 3/66 475/277 |
| 2016/0363192 A1* | 12/2016 | Lee | F16H 3/66 |
| 2017/0074370 A1* | 3/2017 | Kwon | F16H 3/66 |
| 2017/0159772 A1* | 6/2017 | Cho | F16H 3/66 |
| 2017/0268610 A1* | 9/2017 | Hwang | F16H 3/66 |
| 2018/0087611 A1* | 3/2018 | Schoolcraft | F16H 3/66 |
| 2018/0328462 A1* | 11/2018 | Kim | F16H 3/66 |

\* cited by examiner

*Primary Examiner* — Justin Holmes
(74) *Attorney, Agent, or Firm* — Lempia Summerfield Katz LLC

(57) ABSTRACT

A multi-stage transmission for vehicles includes an input shaft for receiving power from an engine, an output shaft for outputting the power, a first planetary gear device, a second planetary gear device, a third planetary gear device, and a fourth planetary gear device. Each of the planetary gear devices has three rotary elements, a first rotary shaft connected to the input shaft, a second rotary shaft, a third rotary shaft, a fourth rotary shaft, a fifth rotary shaft, a sixth rotary shaft, a seventh rotary shaft, and an eighth rotary shaft connected to the third rotary element of the third planetary gear device, to the second rotary element of the fourth planetary gear device, and to the output shaft.

4 Claims, 2 Drawing Sheets

FIG. 2

| GEAR STEP | CL1 | CL2 | CL3 | CL4 | B1 | B2 | GEAR RATIO |
|---|---|---|---|---|---|---|---|
| 1ST | | | ● | ● | | ● | 4.000 |
| 2ND | | | ● | ● | ● | | 2.421 |
| 3RD | | | ● | | ● | ● | 2.000 |
| 4TH | ● | | ● | | ● | | 1.500 |
| 5TH | ● | | ● | | | ● | 1.308 |
| 6TH | ● | ● | ● | | | | 1.000 |
| 7TH | ● | ● | | | | ● | 0.810 |
| 8TH | ● | ● | | | ● | | 0.750 |
| 9TH | | ● | | | ● | ● | 0.667 |
| 10TH | | ● | | ● | ● | | 0.526 |
| REV | ● | | | ● | | ● | -3.778 |

MULTI-STAGE TRANSMISSION FOR VEHICLES

CROSS-REFERENCE TO RELATED APPLICATION

This application claims the priority benefit of Korean Patent Application No. 10-2017-0125746, filed on Sep. 28, 2017, in the Korean Intellectual Property Office, the disclosure of which is incorporated herein by reference.

BACKGROUND

Field of the Disclosure

The present disclosure relates to a multi-stage transmission for vehicles. More particularly, the disclosure relates to a multi-stage transmission for vehicles configured such that the maximum possible number of gear shift stages is realized through a relatively small number of parts and a simple structure, whereby the fuel economy of vehicles is improved.

Description of the Related Art

The recent increase in oil prices has forced vehicle manufacturers all around the world to improve the fuel economy of vehicles. Extensive effort has been made to reduce the weight of engines through various technologies, such as downsizing, to improve the fuel economy of vehicles.

One of the fuel economy improvement methods that are applicable to a transmission provided in a vehicle is increasing the number of gear shift stages of the transmission such that the engine can be operated at a more efficient operation point.

In the method in which the number of gear shift stages of the transmission is increased, the engine can be driven within a relatively low RPM range of the engine, whereby the noise of the vehicle may be further attenuated.

As the number of gear shift stages of the transmission is increased, the number of parts constituting the transmission is also increased. The increased number of parts results in lowering the ease of fitting the transmission in the vehicle, increasing the costs and weight of the transmission, and reducing the transfer efficiency of the transmission. For these reasons, it is important to provide a transmission that exhibits maximum efficiency while having a small number of parts and a relatively simple structure in order to maximize the effect of improving fuel efficiency through the increase in the number of gear shift stages of the transmission.

The matters disclosed in this section are merely for enhancement of understanding of the general background of the disclosure and should not be taken as an acknowledgment or any form of suggestion that the matters form the related art already known to a person skilled in the art.

SUMMARY

An object of the present disclosure is to provide a multi-stage transmission for vehicles. The multi-stage transmission is configured such that 10 forward stages and 1 reverse stage are realized through a relatively small number of parts and a simple structure. The fuel economy of vehicles is improved through driving of an engine at an optimal operation point. The quietness of vehicles is improved through quieter driving of the engine.

In accordance with the present disclosure, the above and other objects can be accomplished by the provision of a multi-stage transmission for vehicles that includes an input shaft for receiving power from an engine, an output shaft for outputting the power, a first planetary gear device, a second planetary gear device, a third planetary gear device, and a fourth planetary gear device. Each of the planetary gear devices has three rotary elements, a first rotary shaft connected to the input shaft, a second rotary shaft connected to a first rotary element of the first planetary gear device and to a first rotary element of the second planetary gear device, a third rotary shaft connected to a second rotary element of the first planetary gear device and to a third rotary element of the second planetary gear device, a fourth rotary shaft connected to a third rotary element of the first planetary gear device, a fifth rotary shaft connected to a second rotary element of the second planetary gear device and to a first rotary element of the third planetary gear device, a sixth rotary shaft connected to a second rotary element of the third planetary gear device and to a third rotary element of the fourth planetary gear device, a seventh rotary shaft connected to a first rotary element of the fourth planetary gear device, and an eighth rotary shaft connected to a third rotary element of the third planetary gear device, to a second rotary element of the fourth planetary gear device, and to the output shaft.

The multi-stage transmission may further include four clutches that interconnect the rotary shafts in respective pairs and two brakes that selectively connect one of the rotary shafts to which the input shaft or the output shaft is not connected to a transmission case.

The four clutches may include a first clutch mounted between the first rotary shaft and the second rotary shaft, a second clutch mounted between the first rotary shaft and the sixth rotary shaft, a third clutch mounted between the first rotary shaft and the seventh rotary shaft, and a fourth clutch mounted between the fourth rotary shaft and the sixth rotary shaft. The two brakes may include a first brake mounted between the third rotary shaft and the transmission case and a second brake mounted between the fourth rotary shaft and the transmission case.

The first, second, and third rotary elements of the first planetary gear device may include a first sun gear, a first carrier, and a first ring gear. The first, second, and third rotary elements of the second planetary gear device may include a second sun gear, a second carrier, and a second ring gear. The first, second, and third rotary elements of the third planetary gear device may include a third sun gear, a third carrier, and a third ring gear. The first, second, and third rotary elements of the fourth planetary gear device may include a fourth sun gear, a fourth carrier, and a fourth ring gear.

BRIEF DESCRIPTION OF THE DRAWINGS

The above and other objects, features, and other advantages of the present disclosure will be more clearly understood from the following detailed description when taken in conjunction with the accompanying drawings, in which:

FIG. 2 is a table showing operation modes in which respective gear shift stages are realized in the transmission of FIG. 1.

DETAILED DESCRIPTION

Figure 1:
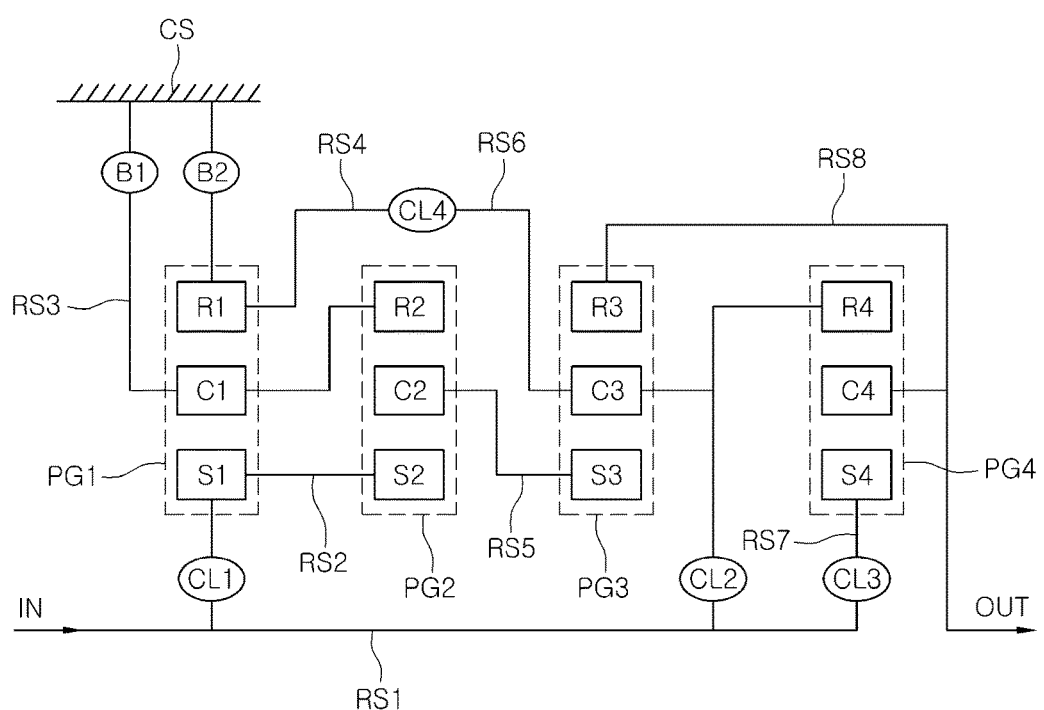
FIG. 1 is a view showing the structure of a multi-stage transmission for vehicles according to the present disclosure.

Hereinafter, embodiments of a multi-stage transmission for vehicles according to the present disclosure will be described with reference to the accompanying drawings.

Referring to FIG. 1, a multi-stage transmission for vehicles according to the present disclosure includes an input shaft IN and an output shaft OUT. The multi-stage transmission further includes a first planetary gear device PG1, a second planetary gear device PG2, a third planetary gear device PG3, and a fourth planetary gear device PG4 configured to transmit rotary force between the input shaft IN and the output shaft OUT, each of the planetary gear devices with three rotary elements, and six gear shift elements connected to the rotary elements of the planetary gear devices.

The multi-stage transmission for vehicles according to the present disclosure further includes a first rotary shaft RS1 connected to the input shaft IN, a second rotary shaft RS2 connected to a first rotary element S1 of the first planetary gear device PG1 and to a first rotary element S2 of the second planetary gear device PG2, a third rotary shaft RS3 connected to a second rotary element C1 of the first planetary gear device PG1 and to a third rotary element R2 of the second planetary gear device PG2, a fourth rotary shaft RS4 connected to a third rotary element R1 of the first planetary gear device PG1, a fifth rotary shaft RS5 connected to a second rotary element C2 of the second planetary gear device PG2 and to a first rotary element S3 of the third planetary gear device PG3, a sixth rotary shaft RS6 connected to a second rotary element C3 of the third planetary gear device PG3 and to a third rotary element R4 of the fourth planetary gear device PG4, a seventh rotary shaft RS7 connected to a first rotary element S4 of the fourth planetary gear device PG4, and an eighth rotary shaft RS8 connected to a third rotary element R3 of the third planetary gear device PG3, to a second rotary element C4 of the fourth planetary gear device PG4, and to the output shaft OUT.

The first planetary gear device PG1, the second planetary gear device PG2, the third planetary gear device PG3, and the fourth planetary gear device PG4 may be sequentially arranged in the axial direction from the input shaft IN to the output shaft OUT.

The gear shift elements include four clutches that interconnect the rotary shafts in respective pairs and two brakes that selectively connect one of the rotary shafts to which the input shaft IN or the output shaft OUT is not connected to the transmission case CS.

The four clutches include a first clutch CL1 mounted between the first rotary shaft RS1 and the second rotary shaft RS2, a second clutch CL2 mounted between the first rotary shaft RS1 and the sixth rotary shaft RS6, a third clutch CL3 mounted between the first rotary shaft RS1 and the seventh rotary shaft RS7, and a fourth clutch CL4 mounted between the fourth rotary shaft RS4 and the sixth rotary shaft RS6.

The first rotary element S1 of the first planetary gear device PG1 and the input shaft IN are intermittently connected to each other via the first clutch CL1. The second rotary element C3 of the third planetary gear device PG3 and the input shaft IN are intermittently connected to each other via the second clutch CL2. The first rotary element S4 of the fourth planetary gear device PG4 and the input shaft IN are intermittently connected to each other via the third clutch CL3. The third rotary element R1 of the first planetary gear device PG1 and the second rotary element C3 of the third planetary gear device PG3 are intermittently connected to each other via the fourth clutch CL4.

The two brakes include a first brake B1 mounted between the third rotary shaft RS3 and the transmission case CS and a second brake B2 mounted between the fourth rotary shaft RS4 and the transmission case CS.

That is, the second rotary element C1 of the first planetary gear device PG1 may be connected to the transmission case CS via the first brake B1 so as to be fixed or freely rotatable. The third rotary element R1 of the first planetary gear device PG1 may be connected to the transmission case CS via the second brake B2 so as to be fixed or freely rotatable.

The first brake B1, the second brake B2, the first clutch CL1, the second clutch CL2, the third clutch CL3, and the fourth clutch CL4 may be controlled by a controller (not shown). The first brake B1, the second brake B2, the first clutch CL1, the second clutch CL2, the third clutch CL3, and the fourth clutch CL4 are operated according to the operation mode table shown in FIG. 2 depending on the travelling situation of a vehicle, whereby 10 forward stages and 1 reverse stage of a vehicle are realized.

Assuming that the first brake B1, the second brake B2, the first clutch CL1, the second clutch CL2, the third clutch CL3, and the fourth clutch CL4 are referred to as "gear shift elements," the transmission according to the present disclosure is configured such that one of the gear shift elements is released and another of the gear shift elements is connected in order to achieve a series of gear shifts ranging from a first stage to a tenth stage, as shown in FIG. 2. That is, a so-called clutch-to-clutch transmission is possible.

The first, second, and third rotary elements of the first planetary gear device PG1 include a first sun gear, a first carrier, and a first ring gear. The first, second, and third rotary elements of the second planetary gear device PG2 include a second sun gear, a second carrier, and a second ring gear. The first, second, and third rotary elements of the third planetary gear device PG3 include a third sun gear, a third carrier, and a third ring gear. The first, second, and third rotary elements of the fourth planetary gear device PG4 include a fourth sun gear, a fourth carrier, and a fourth ring gear.

The multi-stage transmission, including the four planetary gear devices and the six gear shift elements as described above, may realize 10 forward stages and 1 reverse stage according to the operation mode table shown in FIG. 2. A large number of gear shift stages, i.e. 10 gear shift stages, may be realized through a relatively small number of parts, a simple structure, and a small weight. The fuel economy of vehicles is improved by the provision of gear ratios that are further optimized in consideration of the traveling situation of a vehicle.

As is apparent from the above description, the present disclosure provides a multi-stage transmission for vehicles configured such that 10 forward stages and 1 reverse stage are realized through a relatively small number of parts and a simple structure. The fuel economy of vehicles is improved through driving of an engine at an optimal operation point. The quietness of vehicles is improved through quieter driving of the engine.

Although the embodiments of the present disclosure have been described above with reference to the accompanying drawings, those skilled in the art will appreciate that the present disclosure can be implemented in various other embodiments without changing the technical ideas or features thereof.

What is claimed is:

1. A multi-stage transmission for vehicles comprising:
an input shaft for receiving power from an engine;
an output shaft for outputting the power;
a first planetary gear device, a second planetary gear device, a third planetary gear device, and a fourth planetary gear device, each of the planetary gear devices having three rotary elements;
a first rotary shaft connected to the input shaft;
a second rotary shaft connected to a first rotary element of the first planetary gear device and to a first rotary element of the second planetary gear device;
a third rotary shaft connected to a second rotary element of the first planetary gear device and to a third rotary element of the second planetary gear device;
a fourth rotary shaft connected to a third rotary element of the first planetary gear device;
a fifth rotary shaft connected to a second rotary element of the second planetary gear device and to a first rotary element of the third planetary gear device;
a sixth rotary shaft connected to a second rotary element of the third planetary gear device and to a third rotary element of the fourth planetary gear device;
a seventh rotary shaft connected to a first rotary element of the fourth planetary gear device; and
an eighth rotary shaft connected to a third rotary element of the third planetary gear device, to a second rotary element of the fourth planetary gear device, and to the output shaft.

2. The multi-stage transmission according to claim 1, further comprising:
four clutches that interconnect the rotary shafts in respective pairs; and
two brakes that selectively connect one of the rotary shafts to which the input shaft or the output shaft is not connected to a transmission case.

3. The multi-stage transmission according to claim 2,
wherein the four clutches comprise a first clutch mounted between the first rotary shaft and the second rotary shaft, a second clutch mounted between the first rotary shaft and the sixth rotary shaft, a third clutch mounted between the first rotary shaft and the seventh rotary shaft, and a fourth clutch mounted between the fourth rotary shaft and the sixth rotary shaft, and
wherein the two brakes comprise a first brake mounted between the third rotary shaft and the transmission case and a second brake mounted between the fourth rotary shaft and the transmission case.

4. The multi-stage transmission according to claim 1,
wherein the first, the second, and the third rotary elements of the first planetary gear device comprise a first sun gear, a first carrier, and a first ring gear,
wherein the first, the second, and the third rotary elements of the second planetary gear device comprise a second sun gear, a second carrier, and a second ring gear,
wherein the first, the second, and the third rotary elements of the third planetary gear device comprise a third sun gear, a third carrier, and a third ring gear, and
wherein the first, the second, and the third rotary elements of the fourth planetary gear device comprise a fourth sun gear, a fourth carrier, and a fourth ring gear.

* * * * *